US006005635A

United States Patent [19]

Saib et al.

[11] Patent Number: 6,005,635

[45] Date of Patent: Dec. 21, 1999

[54] DISPLAYING ALIASED AND ANTI-ALIASED CHARACTERS FROM A SOURCE FONT

[75] Inventors: Joseph Saib; Atsushi Suzuki, both of San Diego, Calif.

[73] Assignees: Sony Corporation, Tokyo, Japan; Sony Electronics, Inc., Park Ridge, N.J.

[21] Appl. No.: 08/858,012

[22] Filed: May 16, 1997

[51] Int. Cl.[6] .......... H04N 9/74

[52] U.S. Cl. .......... 348/557; 348/589; 348/577; 348/600

[58] Field of Search .......... 348/577, 569, 348/589, 557, 600, 585, 599; 345/114, 194, 195, 26, 467, 141; H04N 9/74

*Primary Examiner*—Sherrie Hsia
*Attorney, Agent, or Firm*—Blakely, Sokoloff, Taylor & Zafman LLP

[57] ABSTRACT

A system and methods that provide a simple, but effective, technique for generating aliased and anti-aliased fonts while minimizing both processor and memory requirements are described. For each character of a font, a source pixel representation of the character is generated and stored in memory. Preferrably, the pixels of each anti-aliased character are divided among at least three non-overlapping regions which provide a color/intensity transition between the character and the background to produce an anti-aliased effect. Three of the regions are identified as the foreground region, middle region and background region. To generate a character of the font on a display the source pixel representation of the character described by the three regions is referenced from memory. If the character is to be aliased the middle and background regions are coded to the background color and the foreground region is coded to the foreground color of the character. If the character is to be anti-aliased, the foreground, middle and background regions are coded, respectively, to the color of the character, a value to provide an anti-aliased effect, and the background color. Thus, memory requirements are minimal since only one version of a font is stored. In addition, processor overhead is minimized as the time consuming calculations to generate anti-aliased characters are avoided.

22 Claims, 8 Drawing Sheets

DISPLAYING ALIASED AND ANTI-ALIASED CHARACTERS FROM A SOURCE FONT

FIELD OF THE INVENTION

The present invention is related to the storage and generation of displayable character fonts in aliased and anti-aliased form.

BACKGROUND

Increasing the number of direct broadcast satellite receiver systems in homes has required system cost to be reduced despite increases in features. Reduction of system cost has meant that efficient system design practices must be pursued which, in turn, has meant that a feature that would normally consume large amounts of memory or require fast processors must now use memory and processing power more efficiently. Display of character fonts on a display screen is one feature that has required adoption of efficient memory and processor use.

Unfortunately, a display screen composed of discrete display points or pixels will generally not be able to display a diagonal line without producing a jagged line which has a "staircase" appearance. Since the jagged appearance is undesirable, a variety of anti-aliasing techniques are used to visibly minimize the aliased effects.

To minimize memory requirements, some display systems store only one version of a character font and generate the other version as needed ("on the fly"). It is well known that generation of an anti-aliased font from an aliased font, or vice versa, is a computationally intensive task that requires an expensive and powerful processor. Display systems without strict constraints on memory and processing power typically store both versions of a character font. However, where both adequate processing power and memory are not available, a system will be limited to just one version of a font. Thus, it is desirable to provide the flexibility of minimizing both memory and processor requirements for systems that provide for the display of both aliased and anti-aliased characters.

SUMMARY OF THE INVENTION

The system and method of the present invention provide a simple, but effective, technique for generating aliased and anti-aliased images such as fonts, while minimizing both processor and memory requirements. In one embodiment, for each character of the font, a source pixel representation of the character is stored in memory.

Preferrably, the source pixel representations are generated by dividing the pixels of each anti-aliased character among at least three non-overlapping regions which provide a color/intensity transition between the character and the background to produce an anti-aliased effect. In one embodiment, three regions are defined. The regions are identified as the foreground region, middle region and background region. To generate a character of the font on a display, the source pixel representation of the character described by the three regions is referenced from memory. If the character is to be aliased the middle and background regions are coded to the background color and the foreground region is coded to the foreground color of the character. If the character is to be anti-aliased, the foreground, middle and background regions are coded, respectively, to the color of the character, a value to provide an anti-aliased effect, and the background color.

Thus, memory requirements are minimal since only one version of a font is stored. In addition, processor overhead is minimized as the time consuming calculations to generate anti-aliased characters are avoided.

BRIEF DESCRIPTION OF THE DRAWINGS

The present invention is illustrated by way of example, and not limitation, in the figures of the accompanying drawings in which.

DETAILED DESCRIPTION

A method and apparatus for using one source font to display both aliased and anti-aliased images is described. Although described with reference to certain specific embodiments, those skilled in the art will recognize that the present invention may be practiced without some or all of these details and, further, that the invention may be used in systems (such as wordprocessing or user interfaces) other than the home satellite television receiving system discussed below. More specifically, although the description is made in the context of alphanumeric characters it is clear that the teaching of the invention is generally applicable to a large number of different types of image objects. The present invention decreases the memory and computational intensity requirements of a system that displays both aliased and anti-aliased images. In particular, a system does not have to store two versions, aliased and anti-aliased, of each font. Moreover, a system storing only an aliased version, does not have to calculate "on the fly" the anti-aliased version. In all embodiments of the invention, a source pixel representation, typically an anti-aliased version of the font, is used to display both aliased and anti-aliased characters.

Figure 1:
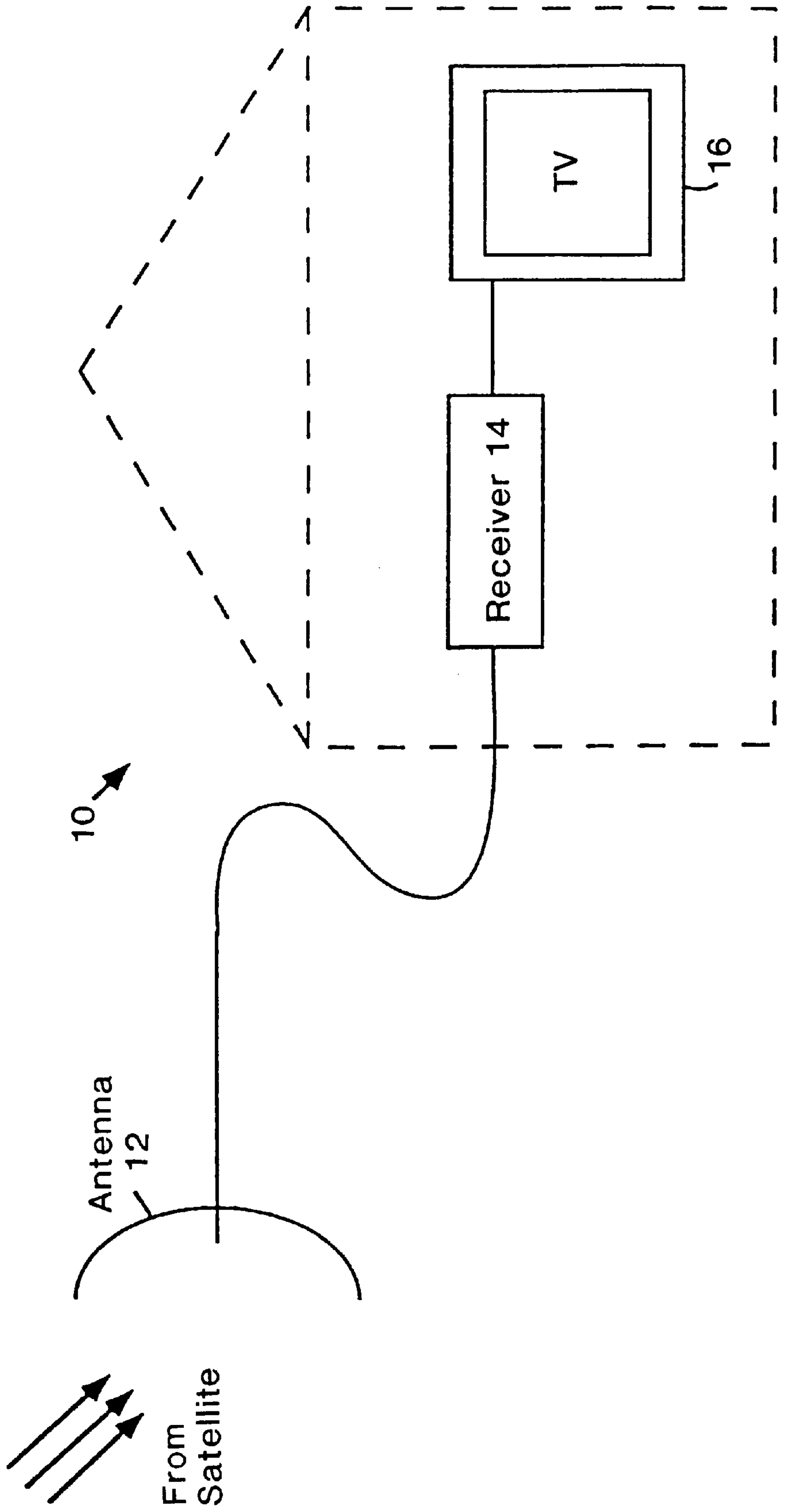
FIG. 1 illustrates a satellite receiver system employing an embodiment of the present invention.

FIG. 1 illustrates a satellite receiver system 10 employing an embodiment of the present invention. Satellite receiver system 10 includes an antenna 12 coupled to a receiver 14. Antenna 12 is to be aligned so as to receive a signal broadcast by a satellite. Signals received by antenna 12 are amplified and downconverted prior to transmission to receiver 14. Such signals generally include audio and/or video information which is decoded by receiver 14. The decoded audio and/or video information is then presented by the receiver 14 to the television (TV) 16 for display. The video information may contain broadcasts of programming as well as instructions to display textual messages or images, on the TV 16. These messages may form an electronic program guide of program descriptions or some other information to the user. The TV 16 is a cathode ray tube (CRT) but those skilled in the art understand it can also be a liquid crystal display.

Figure 2:
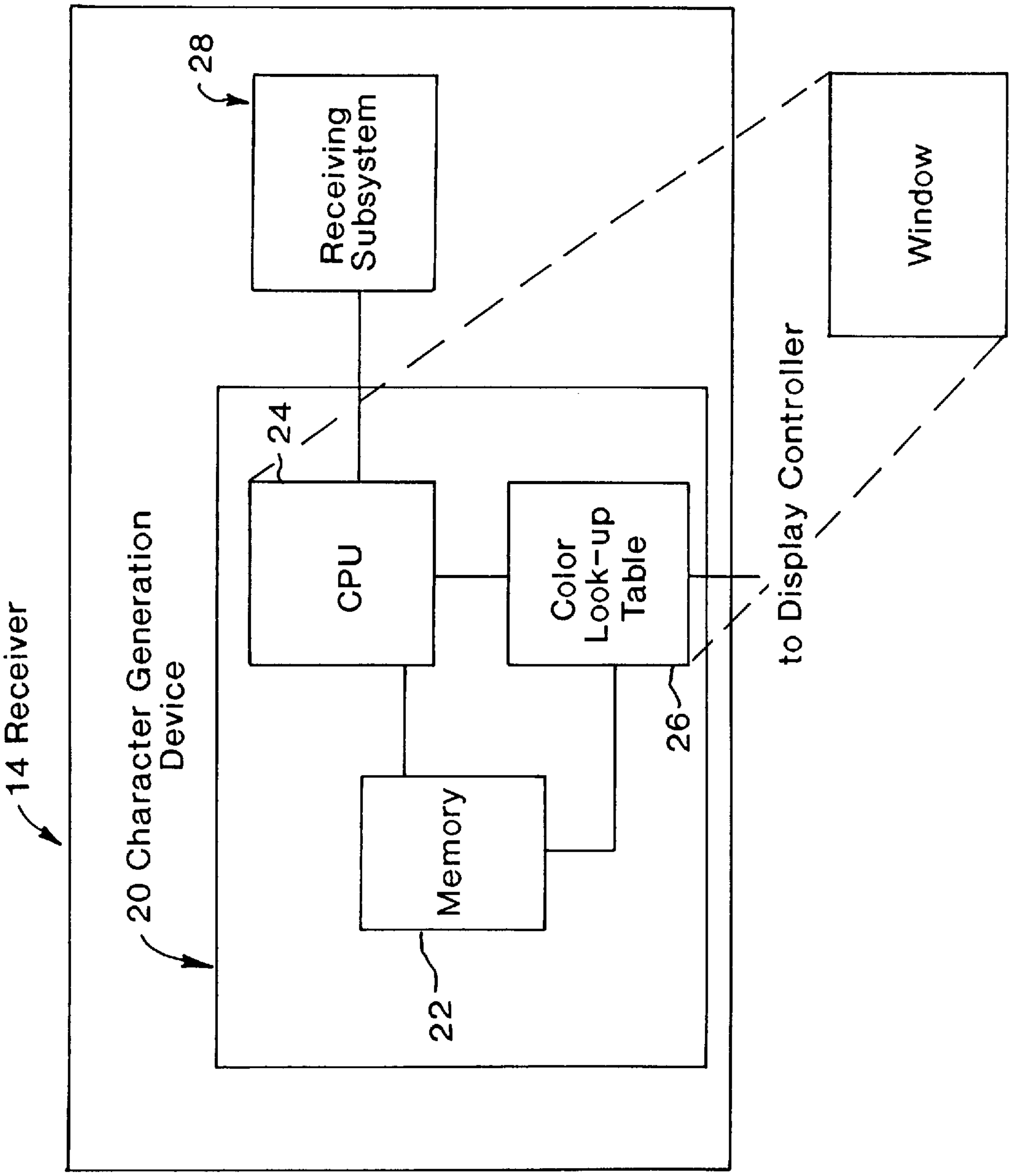
FIG. 2 illustrates a receiver including a character generation device employing the present invention.

In the embodiment illustrated in FIG. 2, receiver 14 includes a character generation device 20 and a receiver subsystem 28. As shown, the character generation device 20 includes a memory device 22, a central processing unit (CPU) 24, and a color generator 26. It is readily apparent that the embodiment shown is functional in nature and representative implementations can use common or representative circuitry to implement the functionality described. Furthermore, the circuitry can be realized by a variety of components including CPUs as well as combintorial and other logic circuits. The receiver subsystem 28 decodes video instructions received through satellite signals and transmits them to the CPU 24 to display text and other images on the TV 16. The memory 22 is configured to store instructions executed by the CPU 24 to perform functions, such as those described herein, and source pixel representations of images and fonts. Although the system described uses a processor and memory, those skilled in the art understand that the present invention may be implemented using hardware exclusively or a mixture of software and hardware. In alternative embodiments, the CPU may be implemented using control logic or circuitry, an embedded controller or other logic devices that can implement a state machine. In the preferred embodiment, the memory 22 is read only memory (ROM). However, those skilled in the art understand that random access memory (e.g., static RAM, dynamic RAM), or a mixture of ROM and RAM can also be used for the memory 22. The color generator 26 can be implemented using programmable logic, RAM or ROM. In the preferred embodiment, the color generator is a color look-up table 26 implemented as RAM. The CPU 24 inputs the pixel values into the color look-up table 26. In response to the pixel values input, the color look-up table 26 generates color codes for the regions of a source pixel representation.

Figure 3A:
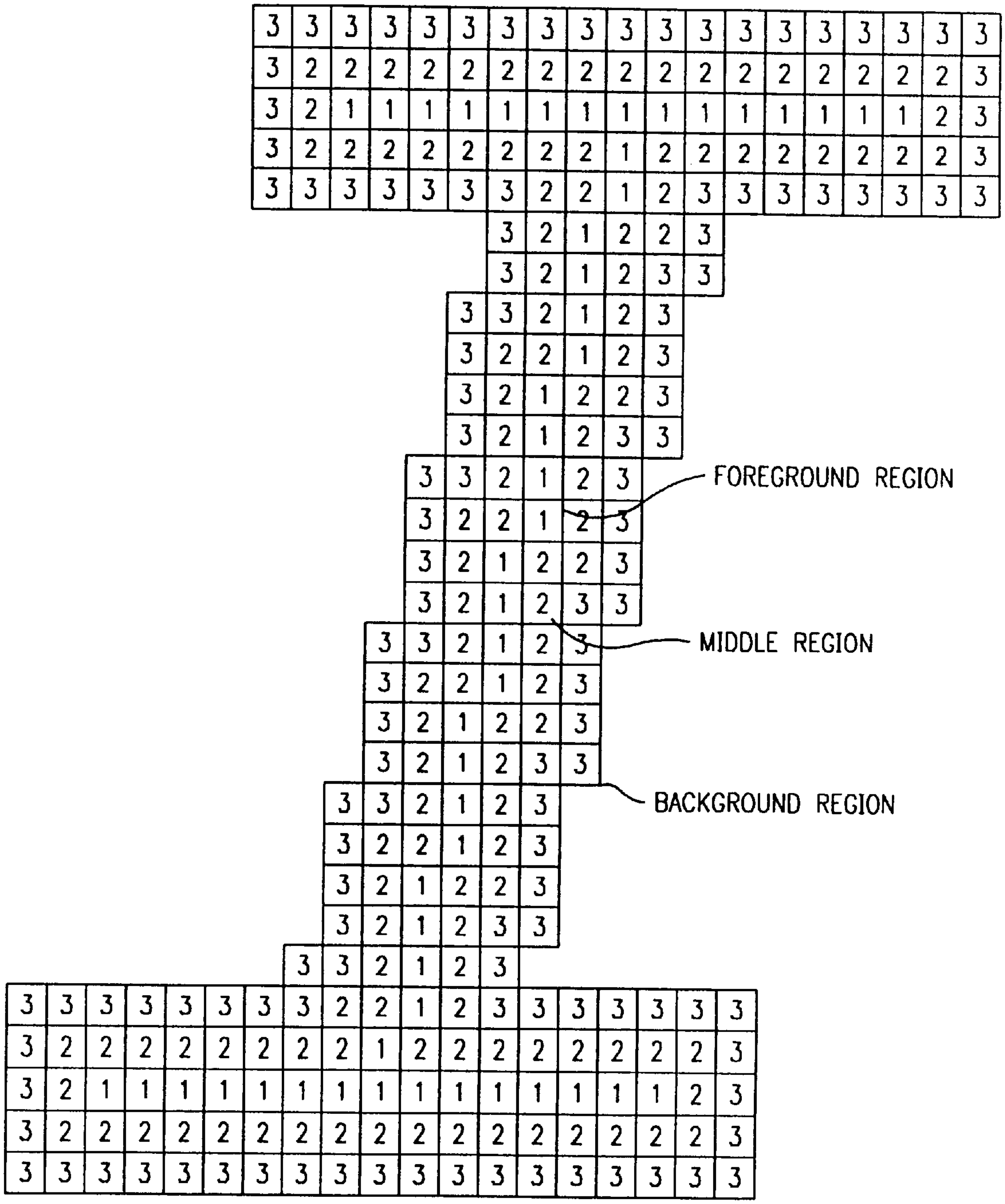
FIG. 3 illustrates an italicized character "I" with pixels divided among three color code regions.

A source pixel representation of one character of a font in accordance with one embodiment of the present invention is illustrated in FIG. 3*a*. The source pixel representation has multiple pixels that are divided among a foreground region, a middle region, and a background region. The pixel values in each region correspond to a different color. When certain characters are to be displayed, the CPU 24 retrieves the source pixel representations of the characters from memory 22. The pixel values retrieved from memory are then used to index into the the color look-up table (CLUT) 26. Depending on the index value determined from the pixel value, the CLUT 26 generates color codes for each pixel which a display controller (not shown) uses to display pixels which form the characters as aliased or anti-aliased images on TV 16 of FIG. 2. In one embodiment, if the character is to be aliased, a foreground color output form the CLUT 26 is selected for the foreground region pixels and the middle region pixels and a background color is selected for the background region pixels. The technique for choosing the foreground colors and background colors displayed so as to achieve a desired degree of contrast between the foreground region pixels and the background region pixels is well known in the art and is not repeated here. If the character is to be anti-aliased, a foreground color, a color to provide an anti-aliased effect, and a background color are generated, respectively, for the foreground, middle and background regions. The technique for choosing a foreground color, a color to provide an anti-aliased effect, and a background color so as to reduce a viewer's perception of aliasing is well known in the art and is not repeated here.

Figure 3B:
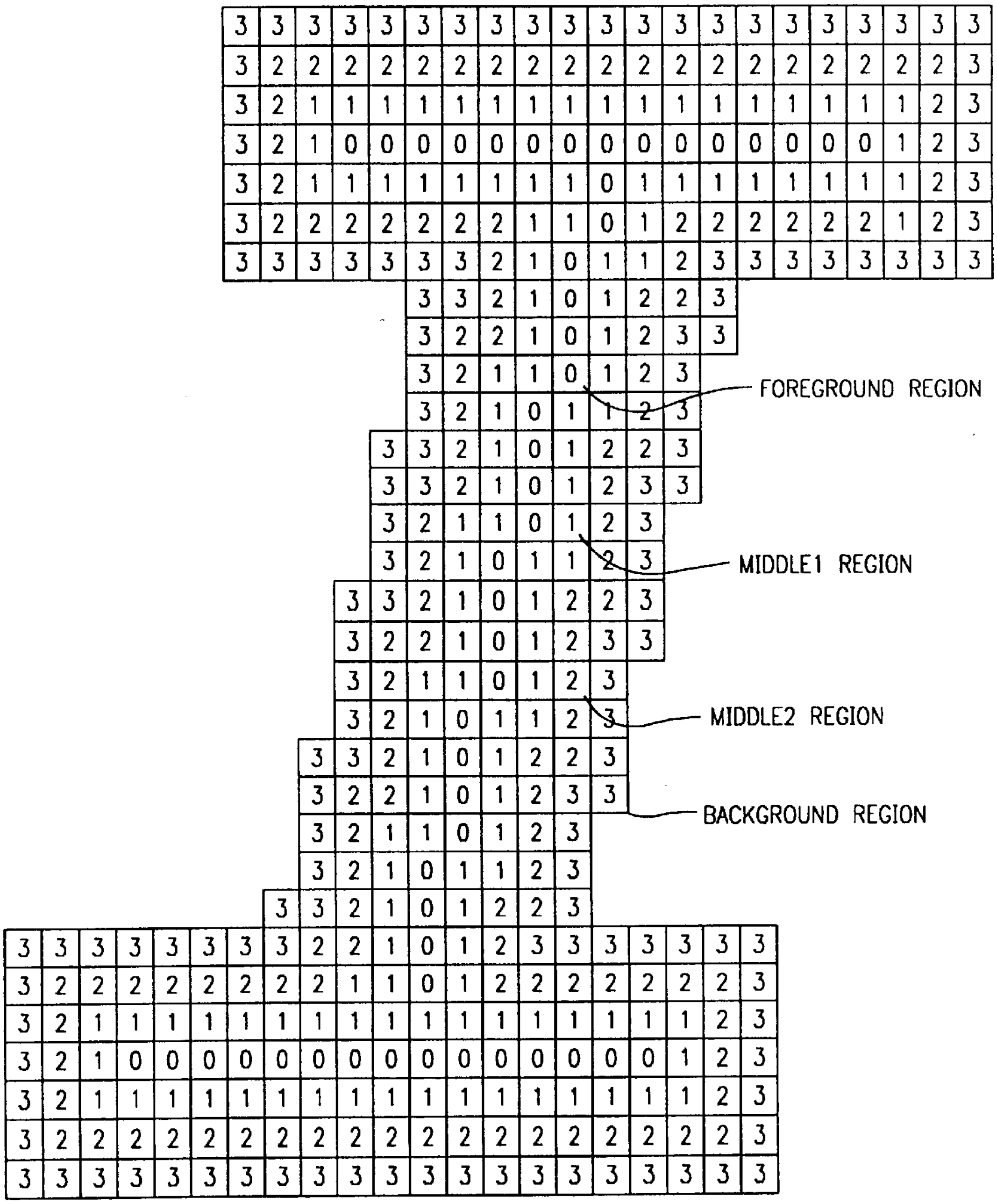

FIG. 3*b* illustrates a source pixel representation of one character of a font in accordance with the preferred embodiment of the present invention. The source pixel representation has multiple pixels that are divided among a foreground region, a middle1 region, a middle2 region and a background region. The pixel values in each region correspond to a different color. In one embodiment, if the character is to be aliased, a foreground color is selected for the foreground region pixels and the middle1 region pixels, and a background color is selected for the middle2 region pixels and the background region pixels. If the character to be displayed is anti-aliased, a foreground color is selected for the foreground region pixels, a first intermediate color is selected for the middle1 region, a second intermediate color is selected for the middle2 region and a background color is selected for the background region. In an alternative embodiment, the first and second intermediate colors may be the same.

In one embodiment, characters are written to particular windows of the display. Each window corresponds to an area on the display screen in which video, text or other images are displayed. Each window has a color look-up table associated with it. The color codes are stored in a particular sequence in a CLUT to define whether the resultant image is aliased or anti-aliased. For example, the color codes indexed by pixel values in the foreground region and middle region correspond to each other in an aliased CLUT and the color codes indexed by the same pixel values in an anti-aliased CLUT are different. Thus, it is preferred that each CLUT of a plurality of CLUTS consistently renders aliased or anti-aliased images. In the present embodiment, each CLUT is associated with a particular window and is pre-configured to generate an aliased or anti-aliased image with certain fixed colors. However, in an embodiment, the memory 22 contains multiple color look-up tables. In such an embodiment, CPU 24 accesses a particular color look-up table based in part upon whether the image is to be aliased or anti-aliased.

Figure 4:
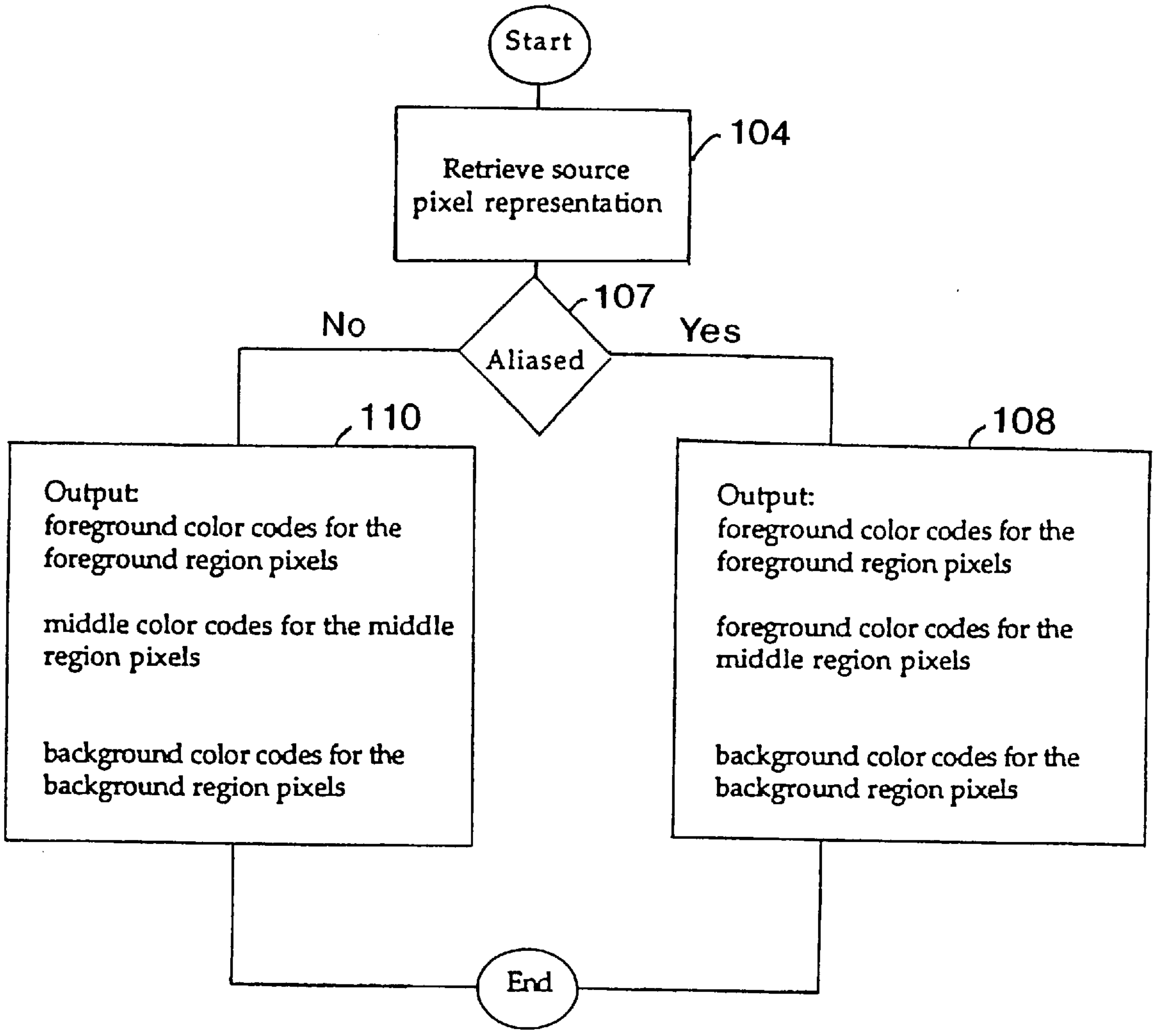
FIG. 4 is a flow diagram illustrating an aliased and anti-aliased image generation routine according to one embodiment.
Figure 5:
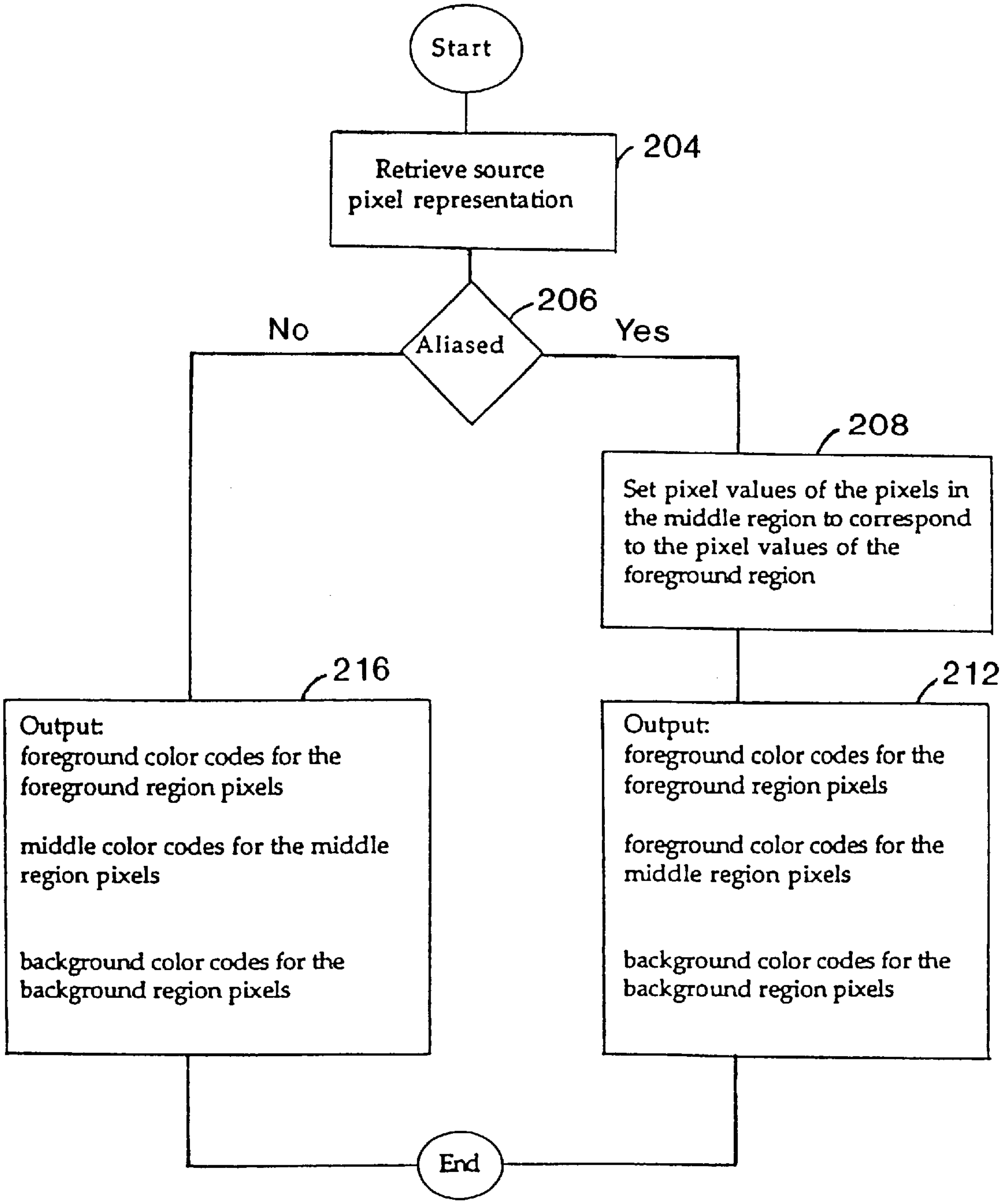
FIG. 5 is a flow diagram illustrating an aliased and anti-aliased image generation routine according to an alternate embodiment.
Figure 6:
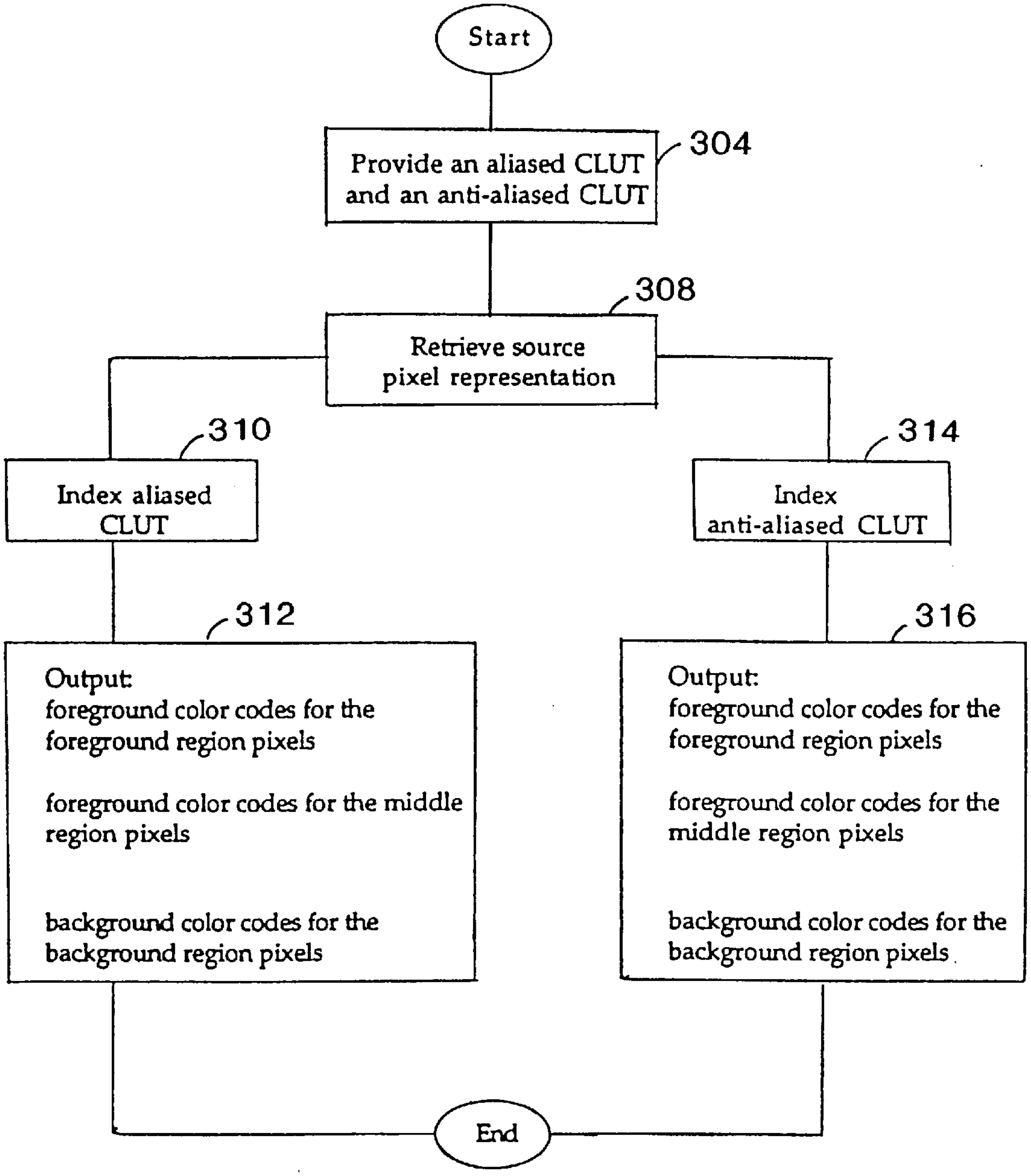
FIG. 6 is a flow diagram illustrating an aliased and anti-aliased image generation routine according to an alternate embodiment.

FIGS. 4, 5 & 6 illustrate multiple processes that are utilized by alternative embodiments of the present invention. The embodiments described in FIGS. 4, 5 & 6 describe the process with respect to a three region character. However, it is readily apparent that the processes can be expanded to include representations having more than three regions. In particular, for source pixel representations that include two or more middle regions, the processes can be configured to have the display output of pixels in one or more than one of the middle regions to correspond to the color of the foreground region and have the display output of pixels in the remaining middle regions to correspond to the color of the background region. For example, if the source pixel region includes two middle regions and the image is to be aliased, the pixels of one middle region (e.g., the one closest to the foreground region) would be displayed as the foreground color and the pixels in the other middle region would be displayed as the background color. Furthermore, the processes described herein cover the pixels in the middle region to be displayed as the foreground color when the image is to be aliased. However, it is readily apparent that the processes could be configured to display the pixels in the middle region in the background color when the displayed image is to be aliased.

FIG. 4 generally describes the process. Referring to FIG. 4, a source pixel representation of a character to be displayed is retrieved at step 104. At step 107, it is determined whether the character is to be rendered as an aliased or an anti-aliased image. If the character is to be aliased, then the process continues at step 108, where a foreground color code is generated for the pixels in both the foreground region and the middle region, and a background color code is generated for the pixels in the background region. On the other hand, if the character is to be anti-aliased the process continues at step 110, where a foreground color code is generated for the pixels in the foreground region, a middle color code is generated for the pixels in the middle region, and a background color code is generated for the pixels in the background region.

FIG. 5 illustrates one embodiment of the present invention. In this embodiment, general purpose color look-up tables not configured specifically for the generation of aliased or anti-aliased images are used. At step 204, a source pixel representation of a character to be displayed is retrieved. At step 206, it is determined whether the character is to be rendered as an aliased or anti-aliased image. This may be determined in a variety of ways. For example, it may be determined by an application causing the images to be rendered in a certain manner or by a flag previously set. If the image is to be aliased, at step 208, the pixel values of the pixels in the middle region are set to correspond to the pixel values of the foreground region. At step 212, a foreground color code used by the display controller is generated for the foreground region pixel values, and a background color code is generated for the background region pixel values. If the image is to be anti-aliased, the pixel values of the middle region are not set to correspond to the pixel values of the foreground region, and, therefore, at step 216, foreground color codes are generated for the foreground region pixel values, middle color codes are generated for the middle region pixel values, and background color codes are generated for the background region pixel values.

Alternatively, instead of modifying the pixel values used to index the CLUT, the CLUT itself can be dynamically updated to change selected values in the CLUT to ensure the middle region pixel values will cause the CLUT to output the foreground color code when an aliased image is to be displayed.

FIG. 6 illustrates an alternative process. At step 304, an aliased CLUT and anti-aliased CLUT are provided. The aliased CLUT and anti-aliased CLUT are each respectively configured to cause the middle region pixel values to output a foreground region color code and a middle region color code. At step 308, a source pixel representation of a character to be displayed is retrieved. At steps 308, 310, and 312, if the character to be displayed as an aliased image, the aliased CLUT is accessed and foreground color codes are generated for the pixels in the foreground region and the middle region, and background color codes are generated for the pixels in the background region.

Alternatively, if the character is to be displayed as an anti-aliased image, at steps 308, 314, and 316, foreground color codes are generated for pixels in the foreground region, middle color codes are generated for pixels in the middle region and background color codes are generated for pixels in the background region.

Figure 7:
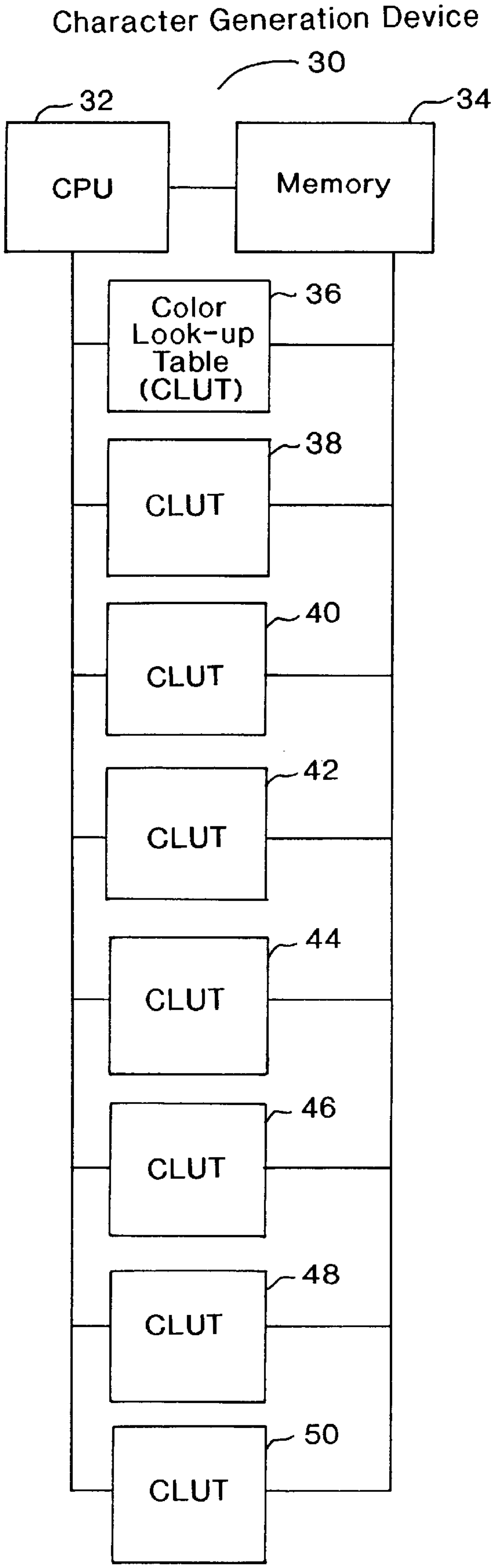
FIG. 7 is a character generation device according to one embodiment employing multiple windows and multiple color look-up tables.

As illustrated in FIG. 7, one embodiment of the present invention employs multiple color look-up tables 36, 38, 40, 42, 44, 46, 48, 50. Each of the multiple color look-up tables 36 is associated with a distinct and separate window. Each window is associated with an area of the physical display screen (not shown) and is characterized to display aliased and anti-aliased images. By having a separate color look-up table for each window either aliased or anti-aliased images may be displayed in the corresponding area of the physical display screen with minimal processing overhead.

Even though FIG. 7 illustrates separate color look-up tables, those skilled in the art understand that color look-up tables can be implemented in a single memory device, multiple memory devices, a single logic device or multiple logic devices.

Thus, a novel display system for anti-aliased and aliased characters for a satellite television receiver system has been disclosed. Although discussed with reference to specific embodiments and the accompanying illustrations, it should be appreciated that the present invention is applicable to a variety of display systems. Accordingly, the invention should only be measured in terms of the claims which follow.

What is claimed is:

1. A method for generating aliased and anti-aliased images, comprising the steps of:

retrieving a source pixel representation of an image to be displayed, the source pixel representation including pixel values in a first region, at least one second region and a third region of the source pixel representation;

generating a first color for the pixel values in the first region and the second region and a second color for the pixel values in the third region if the image to be displayed is aliased;

generating the first color for the pixel values in the first region, a third color for the pixel values in the second region and the second color for the pixel values in the third region if the image to be displayed is anti-aliased.

2. The method of claim 1 wherein the step of generating a first color for the pixel values in the first region and the second region further comprises the step of setting the pixel values of the second region to correspond to the pixel values of the first region such that the same value is generated for pixels in the first region and the second region.

3. The method of claim 1, wherein the step of generating a first color further comprises the steps of:

selecting one of a plurality of color look-up tables comprising at least one first type of look-up table configured to generate aliased images and at least one second type of look-up table configured to generate anti-aliased images, the step of selecting dependent upon whether the image is to be aliased or anti-aliased; and accessing the selected color look-up table using the pixel values.

4. The method as set forth in claim 1, wherein the step of generating a first color for the pixel values in the first region and the second region comprises the step of referencing at least one color look-up table (CLUT) which contains color codes selected according to a pixel value.

5. The method of claim 3, wherein color codes indexed by the pixel values in the first region and color codes indexed by the pixel values in the second region correspond to each other.

6. The method of claim 5, where correspondence is one of equality.

7. As set forth in claim 1, wherein the first region is a foreground region, and third region is a background region.

8. The method of claim 1, wherein the first region is a background region, and third region is a foreground region.

9. The method of claim 1, wherein the step of generating a first color for the pixel values in the first region and the second region further comprises accessing a first color look-up table (CLUT); and wherein the step of generating the first color further comprises accessing a second CLUT.

10. The method of claim 1, wherein the image is to be displayed in a window, said window identifying a color look-up table which contains color codes selected according to the pixel values, said window indicating whether an aliased or anti-aliased image is displayed.

11. An integrated receiver/decoder, comprising:

a receiver subsystem configured to receive and decode satellite signals into data used to generate a display;

a character generation device coupled to the receiver subsystem to receive data indicative of characters to be displayed, including;

a processor (CPU) coupled to a satellite receiver a memory coupled to the CPU, the memory configured to store images comprising pixel representations; and a color generator coupled to the CPU and configured to receive the pixel representations, to generate control codes used to display the images, and to generate a first color for pixel values in a first region and a second region and a second color for the pixel values in a third region if an image to be displayed is aliased; and generate the first color for the pixel values in the first region, a third color for the pixel values in the second region and the second color for the pixel values in the third region if the image to be displayed is anti-aliased.

12. The integrated receiver/decoder of claim 11, wherein the color generator is a color look-up table.

13. The integrated receiver/decoder of claim 11, wherein the color generator includes a plurality of color look-up tables.

14. The integrated receiver/decoder of claim 13, wherein the character generation device is configured to maintain a plurality of windows for displaying the images; and wherein one of the plurality of windows is selectively associated with one of the plurality of color look-up tables.

15. A character generation device, comprising:

a memory configured to store images comprising pixel representations; and a color generator configured to receive the pixel representations, to generate color codes used to display the images, and to generate a first color for pixel values in a first region and a second region and a second color for the pixel values in a third region if an image to be displayed is aliased; and generate the first color for the pixel values in the first region, a third color for the pixel values in the second region and the second color for the pixel values in the third region if the image to be displayed is anti-aliased.

16. The character generation device of claim 15, wherein the color generator is a color look-up table containing the color codes selected according to the pixel values.

17. The character generation device of claim 16, wherein the color look-up table is configured such that the color codes indexed by the pixel values in the first region and the color codes indexed by the pixel values in the second region correspond to each other.

18. The character generation device of claim 17, wherein the correspondence is one of equality.

19. The character generation device of claim 15, wherein the first region is a foreground region, and the third region is a background region.

20. The character generation device of claim 15, wherein the first region is a background region, and the third region is a foreground region.

21. The character generation device of claim 15, wherein the color generator comprises a plurality of color look-up tables containing the color codes selected according to the pixel values, the character generation device is configured to maintain a plurality of windows, each one of the plurality of windows is associated with one of the plurality of color look-up tables, each one of the plurality of color look-up tables is configured to display aliased or anti-aliased images.

22. The character generation device of claim 15, wherein the color generator is configured to access a first color look-up table if the image to be displayed is aliased, the color generator is configured to access a second color look-up table if the image to be displayed is anti-aliased.

* * * * *

UNITED STATES PATENT AND TRADEMARK OFFICE
CERTIFICATE OF CORRECTION

PATENT NO. : 6,005,635
DATED : December 21, 1999
INVENTOR(S) : Saib et al.

It is certified that error appears in the above-identified patent and that said Letters Patent is hereby corrected as shown below:

In the Abstract at line 6 delete "Preferrably" and insert --Preferably--

Signed and Sealed this

Twenty-seventh Day of March, 2001

Attest:

NICHOLAS P. GODICI

Attesting Officer

*Acting Director of the United States Patent and Trademark Office*